US011384893B2

(12) United States Patent
Trudnak et al.

(10) Patent No.: US 11,384,893 B2
(45) Date of Patent: Jul. 12, 2022

(54) DEVICE MOUNT WITH RELEASABLE ATTACHMENT AND ADJUSTABLE ROTATION

(71) Applicants: Robert Trudnak, Lansdale, PA (US); Eric Fulmer, Collegeville, PA (US)

(72) Inventors: Robert Trudnak, Lansdale, PA (US); Eric Fulmer, Collegeville, PA (US)

(73) Assignee: The BBQ Guru, Inc., Warminster, PA (US)

( * ) Notice: Subject to any disclaimer, the term of this patent is extended or adjusted under 35 U.S.C. 154(b) by 243 days.

(21) Appl. No.: 16/804,526

(22) Filed: Feb. 28, 2020

(65) Prior Publication Data

US 2021/0270408 A1 Sep. 2, 2021

(51) Int. Cl.
| | | |
|---|---|---|
| F16M 11/10 | (2006.01) | |
| F16B 2/20 | (2006.01) | |
| F16M 11/04 | (2006.01) | |
| F16M 13/02 | (2006.01) | |
| F16M 11/06 | (2006.01) | |
| F16B 1/00 | (2006.01) | |

(52) U.S. Cl.
CPC .............. *F16M 11/10* (2013.01); *F16B 2/20* (2013.01); *F16M 11/041* (2013.01); *F16M 13/02* (2013.01); *F16B 2001/0035* (2013.01); *F16M 11/06* (2013.01); *F16M 2200/024* (2013.01)

(58) Field of Classification Search
CPC .. F16M 11/10; F16M 11/041; F16M 11/2021; F16M 13/02; F16M 13/022; F16M 2200/024; F16M 2200/028; F16M 11/06; F16B 5/0664; F16B 2/20; F16B 2/22; F16B 1/00; F16B 5/0016; F16B 5/126; B60R 11/02; B60R 11/0229; B60R 11/024; H05K 5/0204; H05K 5/0234; G06F 1/1601; G06F 1/1654; G06F 1/1632; G06F 1/166; G06F 1/1633; H01R 13/627; A45F 220/0508; A45F 2200/0516; A45F 2200/0525; A45F 2200/0533
USPC ..... 248/122.1, 371, 688, 130, 284.1, 122.11, 248/222.11, 222.12, 222.13, 187.1; 403/87, 91, 161
See application file for complete search history.

(56) References Cited

U.S. PATENT DOCUMENTS

| | | | | |
|---|---|---|---|---|
| 4,506,317 A | * | 3/1985 | Duddy | ................ F21V 21/0965 362/396 |
| 4,672,732 A | * | 6/1987 | Ramspacher | ............. F16B 5/02 29/429 |
| 4,907,769 A | * | 3/1990 | Hunley, Jr. | ............. F21V 21/06 248/185.1 |
| 5,398,978 A | * | 3/1995 | Gagnon | .................. F16L 27/08 285/184 |
| 5,836,561 A | * | 11/1998 | Liao | ....................... G10D 13/06 248/291.1 |

(Continued)

*Primary Examiner* — Ingrid M Weinhold
(74) *Attorney, Agent, or Firm* — Cusick IP, PLLC; Clinton J. Cusick, Esq.

(57) ABSTRACT

A device is disclosed that provides secure and releasable connection between a mount and a display device where corresponding structural elements on the mount and a receptor hollow disposed on the display device provide for alternate attachment where the connected structures can be rotated in increments of ninety degrees and consistently and releasably connected. A second axis of rotation is provided around a pivot bolt that can be adjusted or fixed with a threaded adjustment nut.

10 Claims, 8 Drawing Sheets

(56) References Cited

U.S. PATENT DOCUMENTS

| | | | | |
|---|---|---|---|---|
| 5,921,516 | A | * | 7/1999 | Ho .................. F16M 13/02 |
| | | | | 248/206.5 |
| 6,400,560 | B1 | * | 6/2002 | Chian ............. B60R 11/0235 |
| | | | | 248/917 |
| 6,446,913 | B1 | * | 9/2002 | Schroeder ............. F16B 1/00 |
| | | | | 248/222.52 |
| 6,592,241 | B1 | * | 7/2003 | Kovacik ............. F16M 11/10 |
| | | | | 362/275 |
| D566,530 | S | * | 4/2008 | Brassard ................ D8/363 |
| 7,679,892 | B2 | * | 3/2010 | Jung ................ F16M 11/10 |
| | | | | 361/679.21 |
| 8,376,292 | B2 | * | 2/2013 | Cicco ............... F16M 11/08 |
| | | | | 248/176.1 |
| 9,388,934 | B1 | * | 7/2016 | Kilgore ............ F16M 11/105 |
| 9,611,881 | B2 | * | 4/2017 | Khodapanah ..... F16M 11/2021 |
| 9,760,116 | B2 | * | 9/2017 | Wylie ............... G06F 1/1654 |
| 9,869,423 | B2 | * | 1/2018 | Khodapanah ....... F16M 13/022 |
| 10,809,761 | B1 | * | 10/2020 | Lin .................. F16M 11/10 |
| 10,865,934 | B2 | * | 12/2020 | Kwasniewski .... F16M 11/2064 |
| 10,918,227 | B2 | * | 2/2021 | Ditges ............. F16M 13/022 |
| 2007/0012825 | A1 | * | 1/2007 | Yeh ................. F16M 11/105 |
| | | | | 248/122.1 |
| 2012/0267491 | A1 | * | 10/2012 | Chiu ................. F16M 13/00 |
| | | | | 248/221.11 |
| 2014/0265765 | A1 | * | 9/2014 | Khodapanah ........ F16M 11/14 |
| | | | | 312/223.1 |
| 2016/0033074 | A1 | * | 2/2016 | Drakos .............. F16M 13/02 |
| | | | | 248/122.1 |
| 2019/0195417 | A1 | * | 6/2019 | Kwasniewski .... F16M 11/2064 |
| 2020/0081483 | A1 | * | 3/2020 | Laurent ............. G06F 1/1601 |
| 2021/0026409 | A1 | * | 1/2021 | Miles .............. F16M 11/105 |

\* cited by examiner

DEVICE MOUNT WITH RELEASABLE ATTACHMENT AND ADJUSTABLE ROTATION

BACKGROUND OF THE INVENTION

Field of the Invention

The present general inventive concept is directed to an apparatus for mounting and releasably retaining a controller or display device and providing an identical attachment profile when rotated in various multiples of ninety degrees.

Description of the Related Art

The prior art provides for stands and mounts for control devices. Conventional mounts have provided a series of grooves in a base such as a mount bracket and a set of protrusions on the control device. In order to mount the device to the base, the protrusions would have to be inserted into the grooves. Retention relies on gravity and friction to keep the device seated in the base. The requirements of gravity limit the configurations available for inserting the device into the base. In order to maintain stability, the device would have to be inserted into the base in a downward direction to enlist the help of gravity to maintain the disposition of the device in the base or mount bracket.

The need to insert the protrusions of the control device in a generally downward direction necessarily limits the use of a mount bracket to a surface situated below the desired position of the device. The use of a wall mount or an elevated surface mount is not feasible with a conventional mount bracket. Magnets have been used in other control device mounts, in some instances with a flexible neck attachment, but these are limited to the use on metal and magnetic surfaces.

What is needed is a device mount that provides for secure releasable attachment in a number of directions, for example up, down, left, and right. What is needed is a device mount that allows for rotation of the display device to achieve a desired viewing angle.

SUMMARY OF THE INVENTION

It is an aspect of the present invention to provide a device mount that is releasably attached to a display device and can be attached consistently when rotated in increments of 90 degrees.

The above aspects can be obtained by a device mount for releasable attachment comprising a mount with a mount opening having a first side defined by a first retaining tab and a second side defined by a second retaining tab and a first corner defined by a first corner guide and a second corner defined by a second corner guide; the mount opening can further be defined on a third side by a third retaining tab and on a fourth side by a fourth retaining tab, and a friction extension extending from said mount and comprising a pivot recess with a restriction extension extending from said mount and comprising a restriction recess; a stand extending upward from a base wherein the stand comprises a stand recess configured to receive a pivot bolt extending through said restriction recess and said stand recess; and said pivot bolt engages an adjustment nut with a threaded interior where rotation of said adjustment nut prevents rotation of said mount relative to said stand.

It is a further aspect of the invention to provide a corresponding receptor hollow for example on a rear wall of a display device where the receptor hollow is configured for releasable connection to the mount and the receptor hollow is defined at least in part by a first wall chamfer and a second wall chamfer and a first receptor chamfer and a second receptor chamfer. Retention of the mount within the receptor hollow can be aided by a first receptor undercut disposed interior to the first wall chamfer within the receptor hollow and a second receptor undercut disposed interior to said second wall chamfer to receive the retaining tabs of the mount and a feature on the retaining tabs, namely a retaining tab hook that can be feature on each retaining tab next to the corresponding entrance chamfer.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout. The present inventive concept relates to an apparatus for mounting and retaining a device and providing releasable attachment and adjustable rotation.

Figure 1:
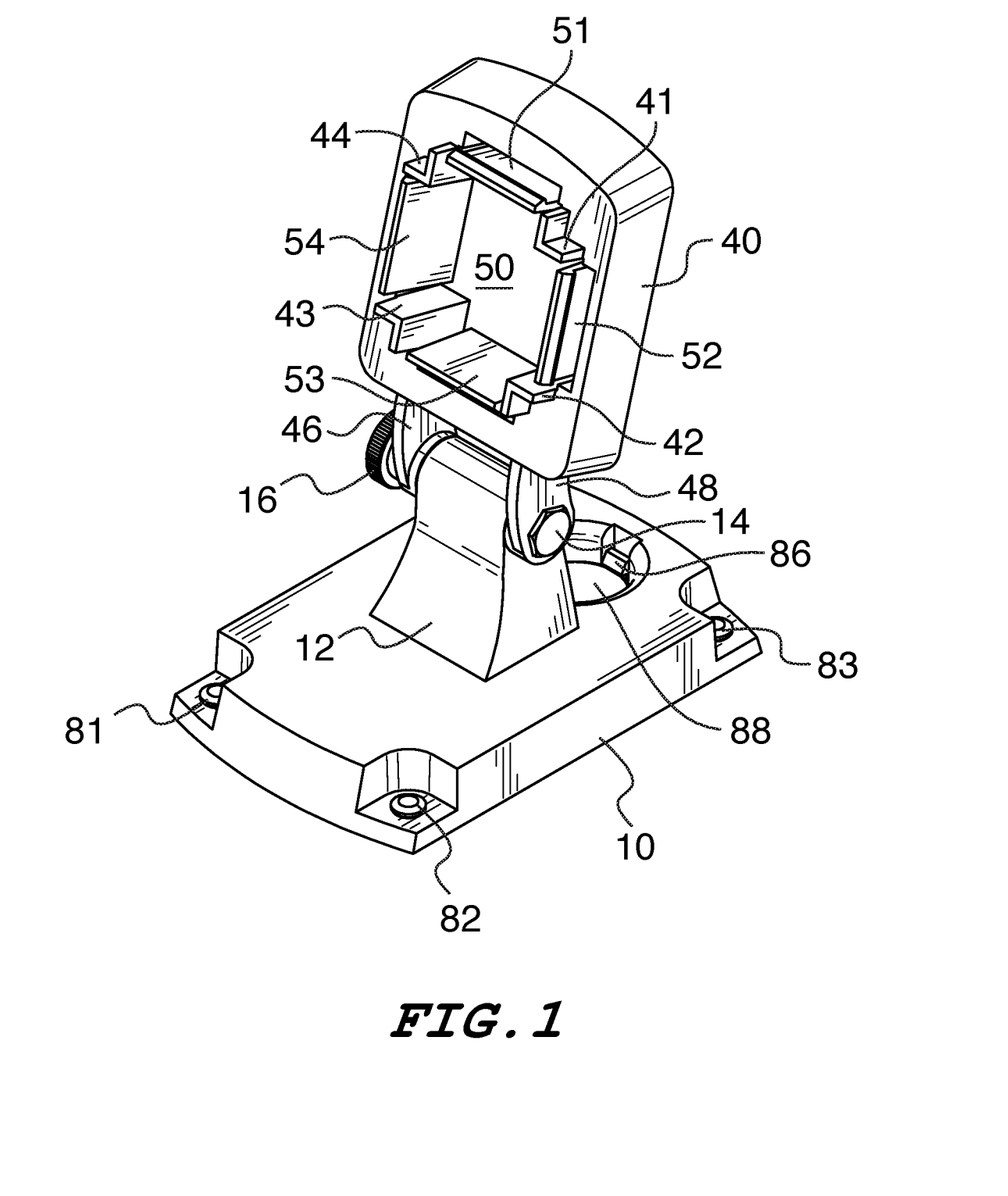
FIG. 1 is a perspective view of a device mount in an embodiment of the invention.
Figure 2:
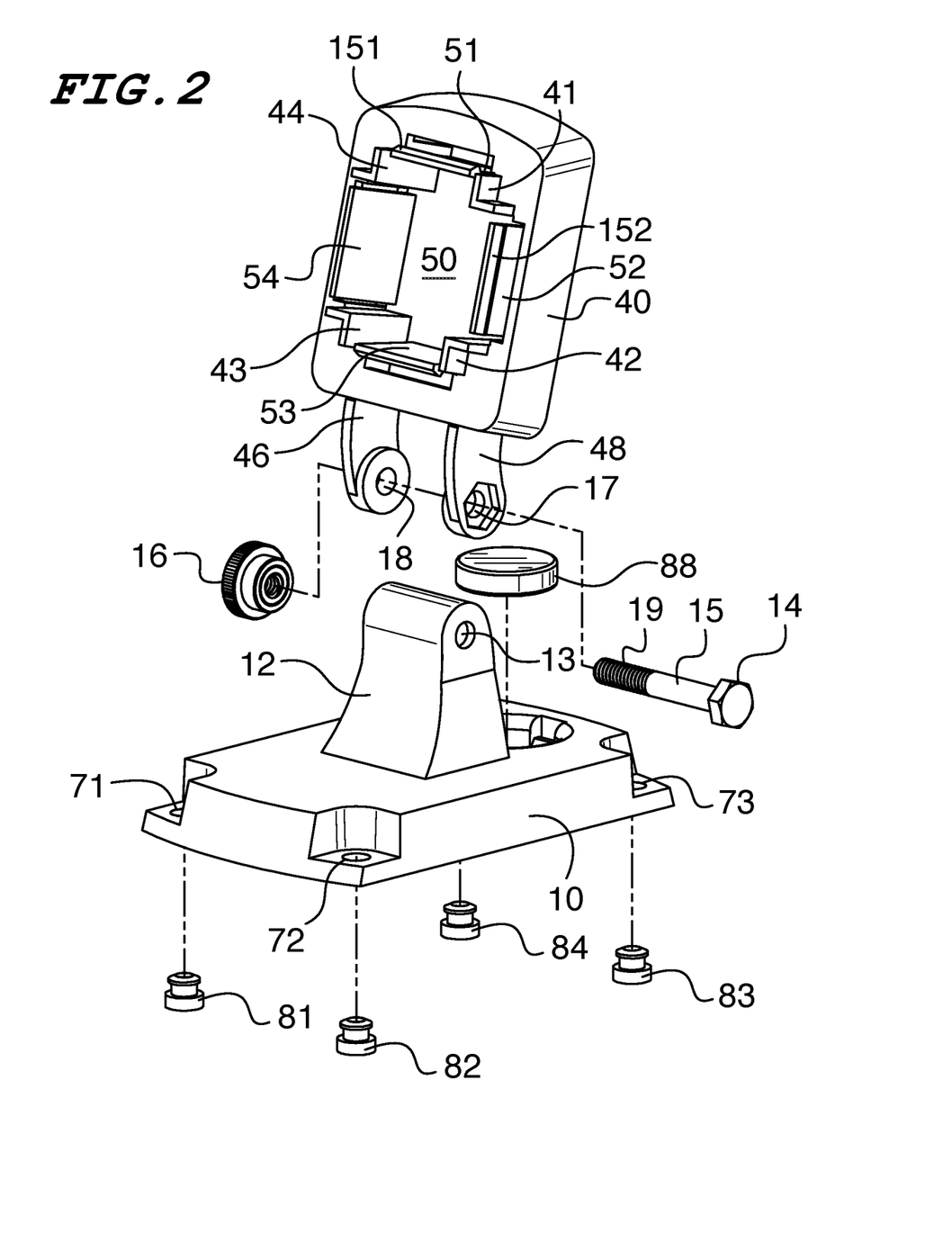
FIG. 2 is an exploded view of a device mount in an embodiment of the invention.

FIG. 1 presents a perspective view of a device mount in an embodiment of the invention. Base 10 can be provided of molded plastic or other stable materials and can be configured with flexible feet for increased stability. For example, first flexible foot 81, second flexible foot 82, third flexible foot 83, and fourth flexible foot 84 can be formed of rubber or plastic or silicone to provide a cushion as well as traction. Stand 12 provides an elevated lift for attachment of mount 40 and aids in visibility. As shown in FIG. 2, pivot bolt 15 comprises pivot bolt head 14 and threaded end 19. Restriction extension 48 is connected to mount 40 and provides for spacing as well as physical support. Restriction extension 48 can be formed with restriction recess 17 configured to match the shape of pivot bolt head 14 and prevent rotation of restriction extension 48 relative to pivot bolt head 14 and therefore pivot bolt 15. On the other side of mount 40 can be formed friction extension 46 with pivot recess 18 configured to receive the distal end of pivot bolt 15. Threaded end 19 can be inserted into restriction recess 17 and the stand recess 13, through pivot recess 18, and into adjustment nut 16 which has a threaded interior. In this way, threaded adjustment nut 16 can be turned to draw pivot bolt 15 into adjustment nut 16 and retain pivot bolt head 14 in restriction recess 17. Tightening pivot bolt 15 establishes a fixed position of friction extension 46 and restriction extension 48 relative to stand 12 and provide a fixed viewing angle for mount 40. Loosening adjustment nut 16 allows for the rotation of mount 40 about stand 12 to establish a different desired viewing angle before tightening adjustment nut 16 retains the desired position. As can be appreciated from the drawing, the orientation of mount 40 relative stand 12 can be reversed and the mount 40 can be installed facing in reverse if desired.

Mount 40 can be molded of plastic or other structurally stable material. Suitable materials include nylon, acrylonitrile butadiene styrene (ABS), polycarbonate, or other moldable materials. Mount 40 can be configured to establish releasable connection with a device having a compatible recess shaped to interface with mount 40. The present invention provides a combination of elements configured for easy attachment by a user with structural guides to enhance connection. Additional structures are provided to increase retention and to allow for release of the connection without the need for undue force provided by a user. In order to guide the insertion of mount 40 into a connection recess, first corner guide 41 can be molded into a corner of the mount opening 50. Second corner guide 42, third corner guide 43, and fourth corner guide 44 are configured to provide a rigid geometric definition to the corners of the mount opening 50. Insertion and retention are further enabled by first retaining tab 51 that can also be molded of plastic and is configured to be rigid as to its shape and size and overall dimension. First retaining tab 51 can extend unsupported for a distance of approximately one inch to provide a degree of flex or deflection from the resting orientation, generally perpendicular to the surface of mount 40. In a particular embodiment the first retaining tab 51 can be formed with a length of approximately 0.8 inches. Additional retaining tabs can be provided in similar fashion, namely second retaining tab 52, third retaining tab 53, and fourth retaining tab 54. A magnet 88 can be provided and held in place by retaining hook 86. An additional retaining hook, not shown can be provided opposite first retaining hook 86 for added stability.

FIG. 2 presents an exploded view of a device mount in an embodiment of the invention. Restriction recess 17 is shown with a hexagonal outer circumference to match the circumference of pivot bolt head 14. First foot opening 71 is shown configured to receive first flexible foot 81. In another application of the device of the invention, first foot opening can be suited for receiving a threaded attachment to secure the base 10 of the device to a suitable surface, for example wood. In other applications, a bolt or machine screw can be used to attach base 10 to a metal surface or any surface or structure with an opening where a bolt and nut can be used to secure the base 10. Second foot opening 72, third foot opening 73, and fourth foot opening (not numbered) are similarly configured. The fourth foot opening is shown as receiving and obscured by fourth flexible foot 84. Magnet 88 can be recessed in base 10 at a depth to provide contact between magnet 88 and a metallic surface. Magnet boss 89 can be molded as part of base 10 and serves to retain magnet 88 between magnet boss 89 and retaining hook 86.

Figure 3:
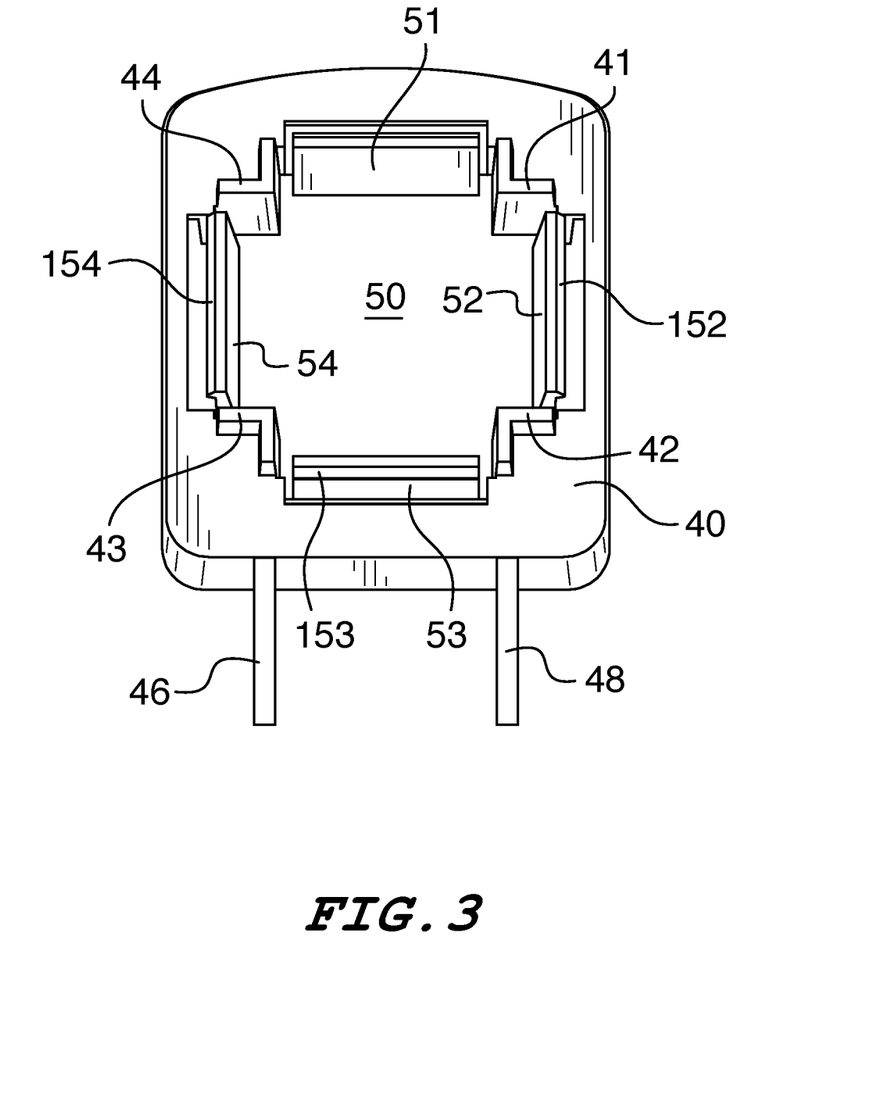
FIG. 3 is an enlarged front view of a mount in an embodiment of the invention.

FIG. 3 presents an enlarged front perspective view of a mount in an embodiment of the invention. Some of the features of the structure of the device are small and are more visible in an enlarged view. In the embodiment of the invention, each of the retaining tabs 51 through 54 are configured in the same shape and size, but each is positioned differently in the Figure and show different aspects of the structure differently. Second retaining tab 52 comprises second entrance chamfer 152. Third entrance chamfer 153, fourth entrance chamfer 154, and first entrance chamfer 151 are similarly formed. Upon insertion of each retaining tab into a compatible recess, the slope of the entrance chamfers facilitates deflection of the respective retaining tab towards mount opening 50 and effectively decreases the distance between corresponding retaining tabs, e.g. first retaining tab 51 and third retaining tab 53 are squeezed closer together, aiding insertion of the mount. Retaining tabs 51 through 54 can be formed of the same material as the mount 40 and base 10, for example nylon.

Figure 4:
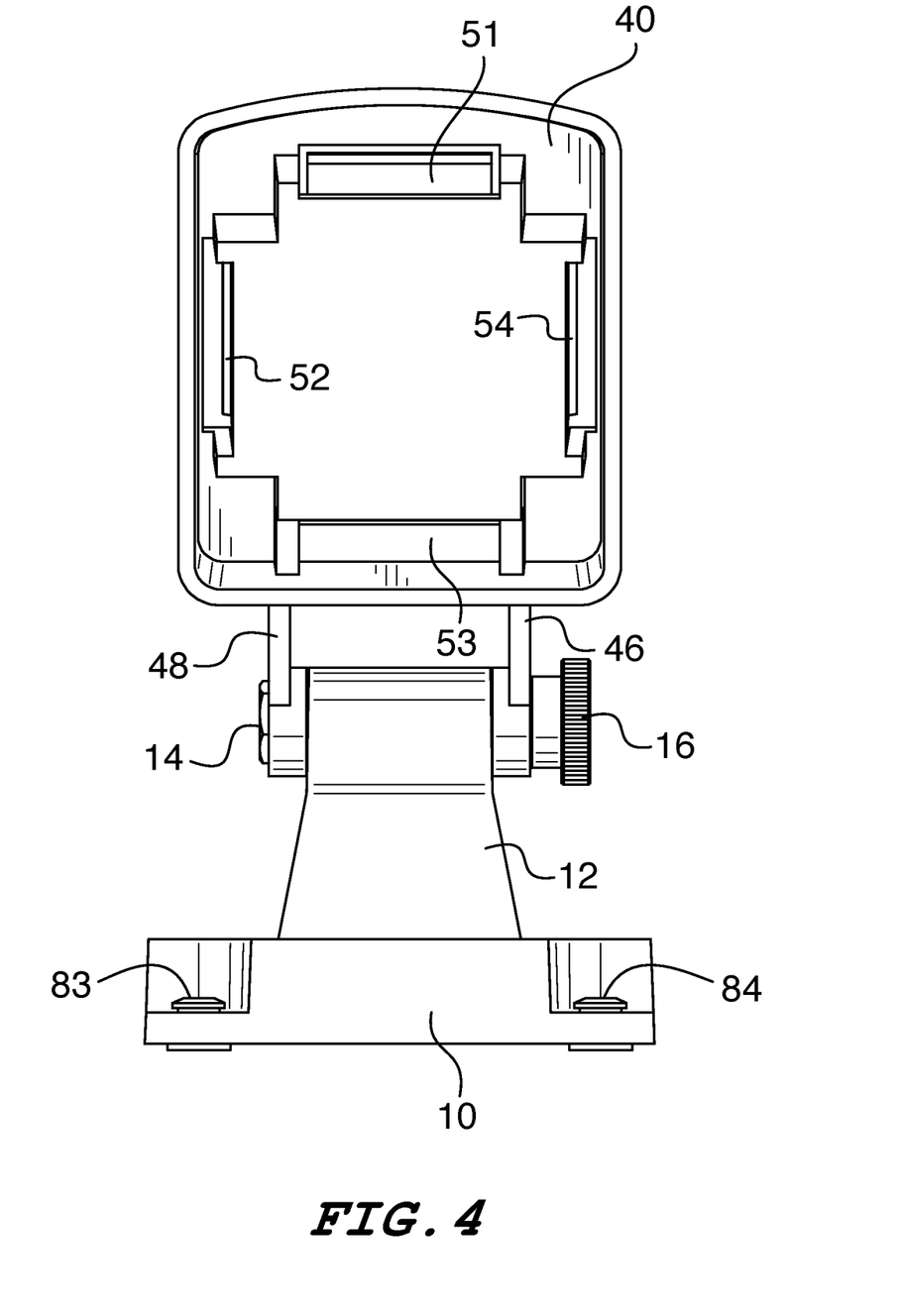
FIG. 4 is a rear view of a device mount in an embodiment of the invention.
Figure 5:
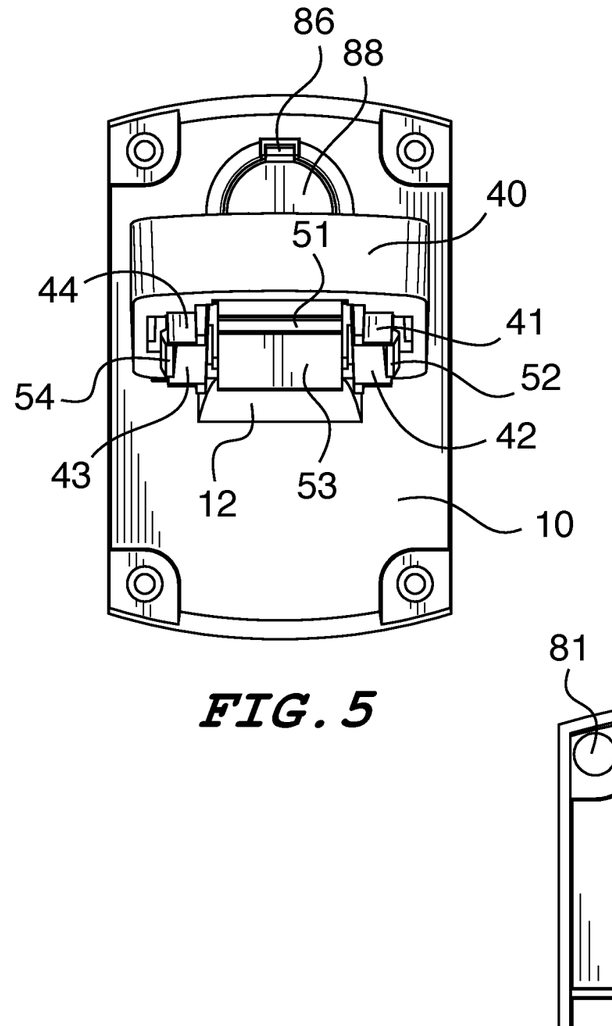
FIG. 5 is a top view of a device mount in an embodiment of the invention.
Figure 6:
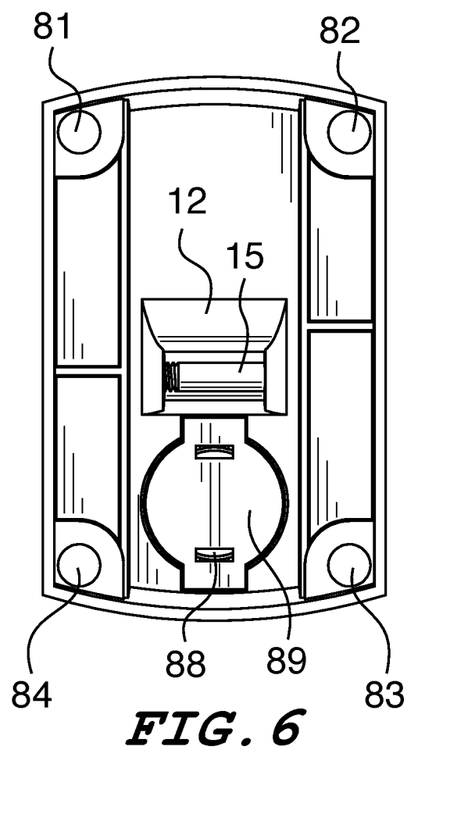
FIG. 6 is a bottom view of a device mount in an embodiment of the invention.

FIG. 4 presents a rear view of a device mount in an embodiment of the invention. FIG. 5 presents a top view of a device mount in an embodiment of the invention. FIG. 6 presents a bottom view of a device mount in an embodiment of the invention. Stand 12 can be molded of plastic and can be hollow. Pivot bolt 15 is shown interior to stand 12.

Figure 7:
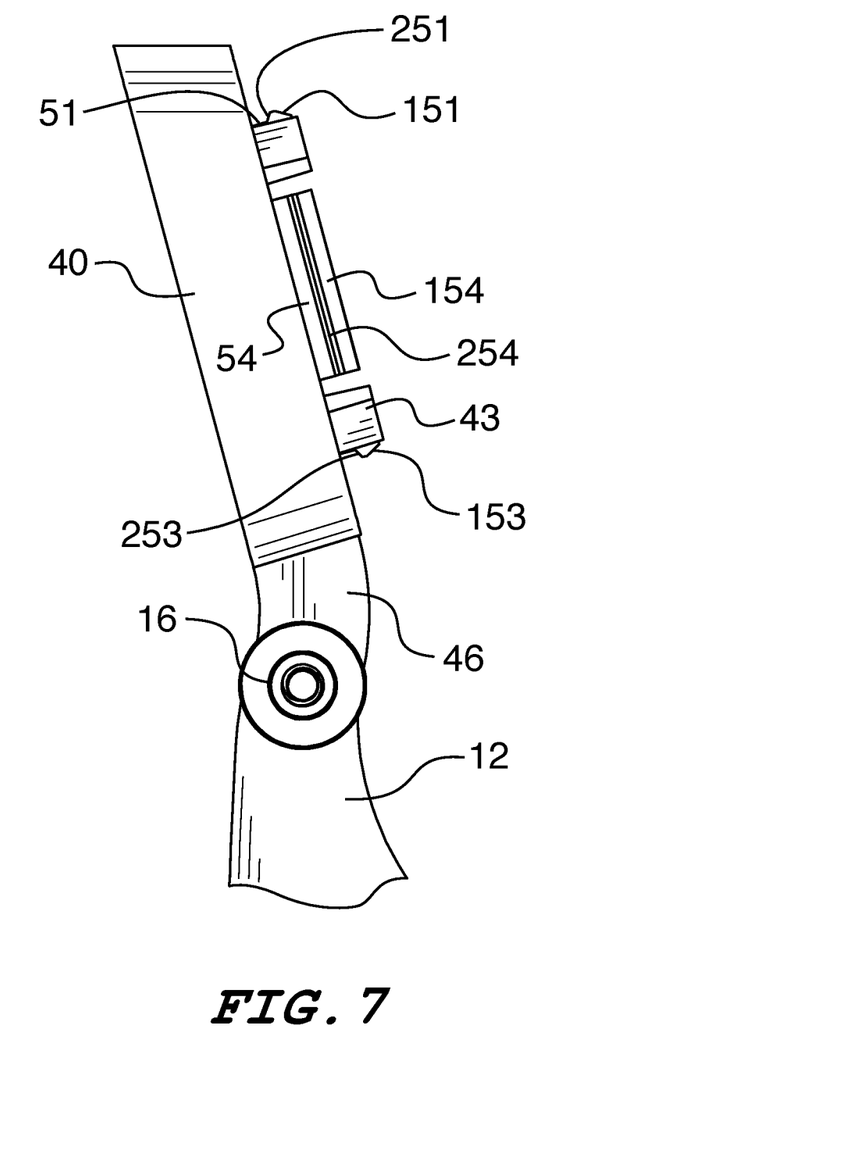
FIG. 7 is an enlarged side view of a mount in an embodiment of the invention.

FIG. 7 presents an enlarged side view of a mount in an embodiment of the invention. First retaining tab 51 is shown in detail with additional features first entrance chamfer 151 and first retaining tab hook 251. Third retaining tab 53 is shown in detail with third entrance chamfer 153 and third retaining tab hook 253. Fourth retaining tab 54 is shown in detail with fourth entrance chamfer 154 and fourth retaining tab hook 254. The second retaining tab 52 can be similarly configured with identical features second entrance chamfer 152 and second retaining tab hook (not numbered) to establish symmetry of the mount 40 and the ability to rotate the mount 40 through various combinations of 90 degrees and present the same overall profile for connection.

Figure 8:
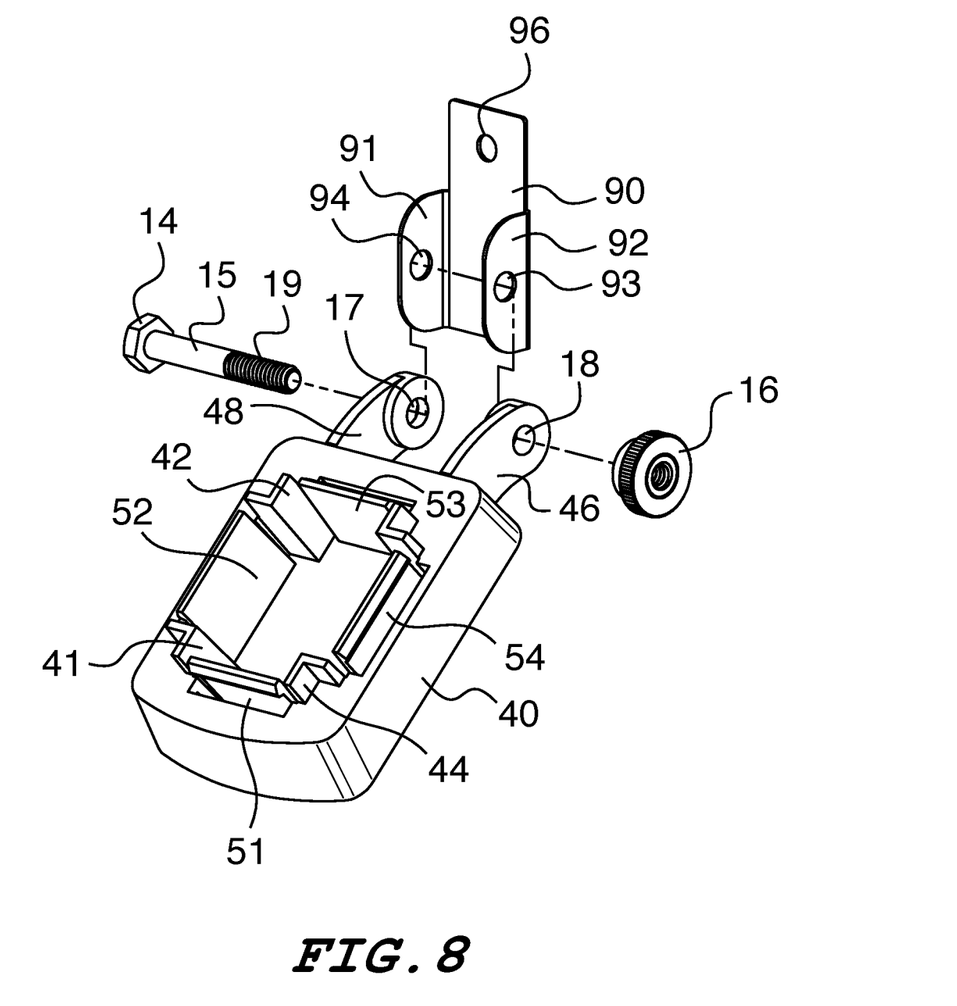
FIG. 8 is an exploded view of a device mount in an alternate embodiment of the invention.

FIG. 8 presents an exploded view of a device mount in an alternate embodiment of the invention. Stand plate 90 can be made of a sturdy material including metal or plastic and can be configured with pivot tab 92 and restriction tab 91. First tab recess 93 can be configured to align with pivot recess 18 and second tab recess 94 can be configured to align with restriction recess 17 so that pivot bolt 15 can pass directly through all four openings and engage a threaded interior of adjustment nut 16. The alternate embodiment presents the adjustment nut 16 and the ability to tighten hex bolt 15 to prevent rotation of mount 40 relative to stand plate 90 or the option to loosen hex bolt 15 to allow for rotation of mount 40 relative to stand plate 90 to establish and maintain a desired viewing angle. Plate opening 96 provides for threaded attachment of stand plate 90 to a desired structure. In an embodiment, stand plate 90 can be inserted into a slot or groove and the relative position of stand plate 90 can be maintained by inserting any kind of fastening device through plate opening 96 and the slot or groove, or the desired structure.

Figure 9:
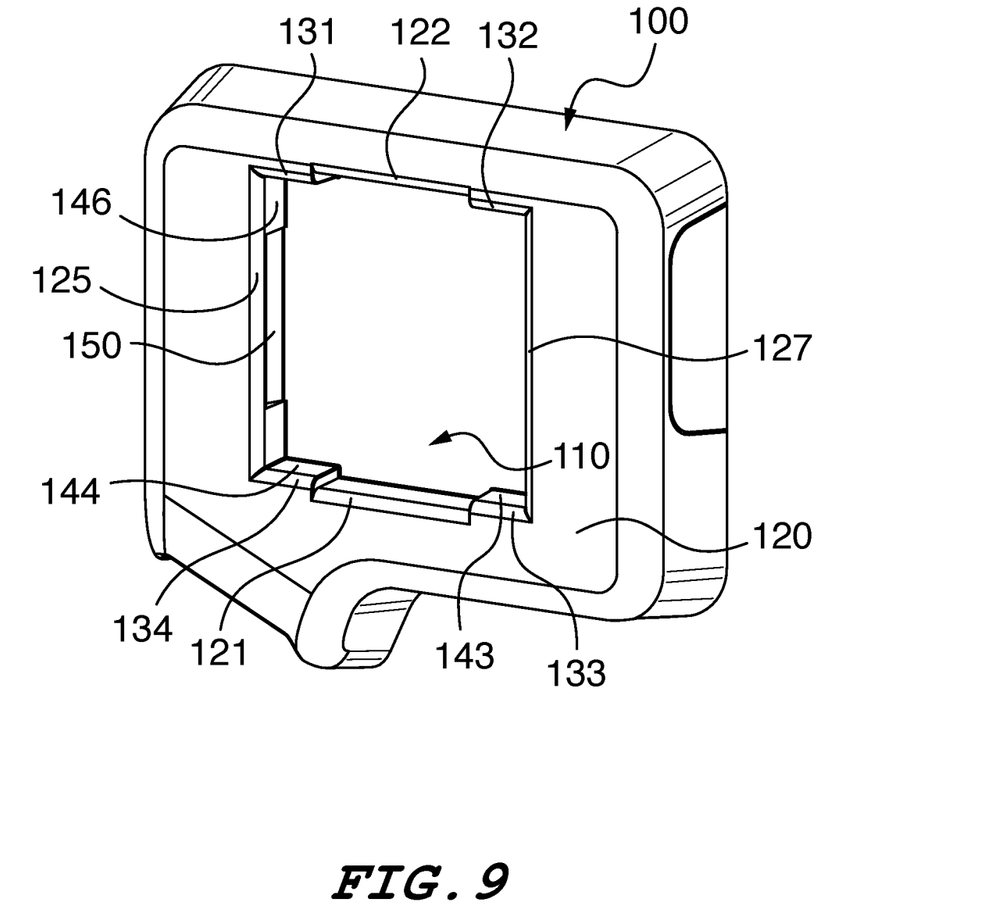
FIG. 9 is a perspective rear view of a display device with a compatible recess for use with an embodiment of the invention.

FIG. 9 is a perspective rear view of a display device with a compatible recess, namely receptor hollow 110 for use with an embodiment of the invention. An exemplary display device is disclosed in U.S. patent application Ser. No.

29/725,951, which is hereby incorporated in its entirety. Hollow 110 is configured with the approximately same shape and size as the corner guides 41 through 44 (the corner guides) and the retaining tabs 51 through 54 (the retaining tabs) discussed above and shown in the Figures. Display device 100 can be any device suited for placement and display of information. Receptor hollow 110 is preferably formed in the rear wall 120 to receive the components of mount 40. In particular, receptor corner 143 defines part of the boundary of receptor hollow 110. Additional boundaries are formed by second receptor corner 144, third receptor corner (not shown) 145, and fourth receptor corner 146. Each of the corners of receptor hollow 110 can be configured in the same shape and size to provide symmetry at 90 degree intervals. First receptor chamfer 121 guides the insertion of a retaining tab, e.g. first retaining tab 51. Second receptor chamfer 122 guides the insertion of the opposing retaining tab, e.g. third retaining tab 53. Receptor hollow 110 presents receiving surfaces that are angled towards the interior to help guide connection where the user cannot easily see the mount 40 where display device 100 is opaque. These receiving surfaces, including the guide chamfers 131 through 134 that interact with corner guides 41 through 44 to align the corner guides into the receptor hollow 110. Other receiving surfaces include first wall chamfer 125 and second wall chamfer 127 that can interact with the entrance chamfers 151 through 154 to guide the mount 40 to align with receptor hollow 110. When rotated, the entrance chamfers 151 through 154 can alternately interact with first receptor chamfer 121 or second receptor chamfer 122. The invention provides for alternate connections and insertions so that display device 100 could be rotated 90 degrees and insertion would still be operable and alternately mount 40 could be rotated any multiple of 90 degrees and insertion would still be operable. Mount 40 and receptor hollow 110 are configured to provide an identical and symmetrical attachment profile when rotated in various multiples of ninety degrees. This rotation capacity provides a degree of freedom in rotating the device for a suitable position. As noted above, adjustment nut 16 can be loosened to allow the mount to rotate relative to the base 10 and provide an additional degree of freedom in rotating the mount 40, and therefore the display device 100, relative to the base 10. In this way, a user is provided two degrees of freedom to rotate the device to obtain an optimal viewing angle. The base 10 can be easily moved to establish a preferred viewing position in combination with rotation about a first axis and rotation about a second axis.

First wall chamfer 125 is shown opposite second wall chamfer 127 and both provide a smoothed opening for the insertion of any of the tabs, e.g. first retaining tab 51 which is shown opposite third retaining tab 53. For example, first entrance chamfer 151 can engage first wall chamfer 125 to deflect first retaining tab 51 towards mount opening 50. Receptor undercut 150 provides additional space for the return to original or non-stressed configuration of first retaining tab 51 and the placement of first retaining tab hook 251 into receptor undercut 150. An addition receptor undercut, not shown, can be formed the same as receptor undercut 150 and positioned interior to second wall chamfer 127, and dimensioned to receive any of the retaining tab hooks, for example third retaining tab hook 253. The retaining tab hooks maintain the connection of mount 40 with display device 100 until removed by a user. The slope of the retaining tab hooks are configured to require a moderate force provided by the hand strength of the user. The embodiment shown in FIG. 9 provides for receptor undercut 150 and an opposing undercut on the opposite side, i.e. left and right. The top and bottom of the receptor hollow 110 are provided without an undercut feature in this particular embodiment. Each receptor undercut allows for additional engagement of a retaining tab hook, e.g. 251 and increases the retention force of an inserted mount. In an embodiment, all four sides of the receptor hollow 110 can be provided with a receptor undercut to increase the retention strength of the connection. Two opposing receptor undercuts have been found to be suitable for durable retention and manageable release by hand.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A device mount for releasable attachment comprising:
   a mount comprising a mount opening wherein a first side of said mount opening is defined by a first retaining tab and a second side of said mount opening is defined by a second retaining tab;
   said first retaining tab is configured for deflection towards said mount opening and comprises a first entrance chamfer;
   said second retaining tab is configured for deflection towards said mount opening and comprises a second entrance chamfer;
   said mount opening further comprises a first corner defined by a first corner guide and a second corner defined by a second corner guide;
   a friction extension extending from said mount and comprising a pivot recess;
   a restriction extension extending from said mount and comprising a restriction recess;
   a stand extending upward from a base wherein said stand comprises a stand recess configured to receive a pivot bolt also extending through said restriction recess and said stand recess; and
   said pivot bolt engages a threaded adjustment nut where rotation of said threaded adjustment nut prevents rotation of said mount relative to said stand.

2. The device mount of claim 1 wherein said pivot bolt comprises a pivot bolt head configured in the shape of a polygon and said restriction recess is configured to match said pivot bolt head and prevent rotation of said pivot bolt relative to said restriction recess, said restriction extension, and said mount.

3. The device mount of claim 1 wherein said mount opening further comprises a third side defined by a third retaining tab and a fourth side defined by a fourth retaining tab.

4. The device mount of claim 3 wherein said mount opening further comprises a third corner defined by a third corner guide and a fourth corner defined by a fourth corner guide.

5. The device mount of claim 4 wherein said base is configured to receive a magnet and a retaining hook is configured to retain said magnet within a magnet boss.

6. The device mount of claim 4 wherein:
said third retaining tab is configured for deflection towards said mount opening and comprises a third entrance chamfer; and
said fourth retaining tab is configured for deflection towards said mount opening and comprises a fourth entrance chamfer.

7. The device mount of claim 6 wherein;
said first retaining tab comprises a first retaining tab hook disposed adjacent said first entrance chamfer;
said second retaining tab comprises a second retaining tab hook disposed adjacent said second entrance chamfer;
said third retaining tab comprises a third retaining tab hook disposed adjacent said third entrance chamfer; and
said fourth retaining tab comprises a fourth retaining tab hook disposed adjacent said fourth entrance chamfer.

8. A device mount in combination with a display device, the device mount comprising:
a mount comprising a mount opening wherein a first side of said mount opening is defined by a first retaining tab and a second side of said mount opening is defined by a second retaining tab;
said first retaining tab is configured for deflection towards said mount opening and comprises a first entrance chamfer;
said second retaining tab is configured for deflection towards said mount opening and comprises a second entrance chamfer;
said mount opening further comprises a first corner defined by a first corner guide and a second corner defined by a second corner guide;
the display device comprising a receptor hollow configured for releasable connection to said mount; and
said receptor hollow defined at least in part by a first wall chamfer and a second wall chamfer and a first receptor chamfer and a second receptor chamfer.

9. The device mount in combination with the display device of claim 8 wherein said receptor hollow is configured to releasably attach the retaining tabs of said mount when said receptor hollow is rotated any multiple of 90 degrees.

10. The device mount in combination with the display device of claim 8, the device mount further comprising:
a friction extension extending from said mount and comprising a pivot recess;
a restriction extension extending from said mount and comprising a restriction recess;
a stand extending upward from a base wherein said stand comprises a stand recess configured to receive a pivot bolt also extending through said restriction recess and said stand recess; and
said pivot bolt engages a threaded adjustment nut where rotation of said threaded adjustment nut prevents rotation of said mount relative to said stand.

* * * * *